United States Patent
Idnani et al.

(10) Patent No.: US 7,539,494 B2
(45) Date of Patent: May 26, 2009

(54) INTER-SITE CALL ROUTING AND ROAMING SUPPORT

(75) Inventors: Ajaykumar R. Idnani, Schaumburg, IL (US); Peter M. Drozt, Prairie Grove, IL (US); Mark D. Hamlen, Palatine, IL (US); Srinivas Miriyala, Fort Worth, TX (US); Steven D. Upp, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 81 days.

(21) Appl. No.: 10/871,785

(22) Filed: Jun. 18, 2004

(65) Prior Publication Data

US 2005/0282543 A1 Dec. 22, 2005

(51) Int. Cl.
*H04Q 7/20* (2006.01)
(52) U.S. Cl. ........................ 455/445; 370/221; 370/223; 370/225; 370/216; 370/217; 370/218; 370/227
(58) Field of Classification Search .............. 455/414.1, 455/433, 435, 436, 445; 370/216, 221, 217, 370/218, 225, 227
See application file for complete search history.

(56) References Cited

U.S. PATENT DOCUMENTS 6,611,590 B1 * 8/2003 Lu et al. ................ 379/265.09

| | | | |
|---|---|---|---|
| 2003/0013489 A1 * | 1/2003 | Mar et al. ..................... | 455/560 |
| 2003/0013490 A1 * | 1/2003 | Shoji et al. ................... | 455/562 |
| 2004/0028213 A1 * | 2/2004 | Goss ........................ | 379/265.09 |
| 2004/0032941 A1 * | 2/2004 | Graham et al. .............. | 379/219 |
| 2005/0069121 A1 * | 3/2005 | Faruque et al. .............. | 379/225 |
| 2005/0143088 A1 * | 6/2005 | Hirsbrunner et al. ........ | 455/455 |

* cited by examiner

*Primary Examiner*—Vincent P Harper
*Assistant Examiner*—Fred A Casca

(57) ABSTRACT

A method (600,700) and apparatus (800) are arranged and operate for facilitating call routing between sites in an enterprise connected by a private IP network (130). A range of identifiers (220-223) served by IP PBXs (120-123) in the enterprise may be registered with a SIP registrar (212) of an inter-site router (210). Call requests to a communication unit (350) outside the home site are routed to the SIP registrar. A site identifier associated with the destination IP PBX allows the call to be completed by the SIP Proxy or the IP PBX where the call was received. When no private IP network is available, a roaming CU registers with a cellular proxy in the visited network. Calls are routed by when an HLR (340) associated with the CU obtains the roaming number from the cellular proxy (330) in the visited site. The MSC completes the call to the visited IP PBX using the roaming number and a local SIP registrar 440 forwards the call to the CU.

23 Claims, 6 Drawing Sheets

INTER-SITE CALL ROUTING AND ROAMING SUPPORT

FIELD OF THE INVENTION

The present invention relates in general to routing of calls between sites within an enterprise, and more specifically to a method and apparatus for routing calls between sites using an inter-site router to support call routing and roaming between sites.

BACKGROUND OF THE INVENTION

Enterprise telephony has gained momentum as diverse telephone services and service needs have expanded. With wireless services accounting for a large degree of enterprise traffic, wired and wireless service support must expand accordingly. Expanded enterprise services might include for example, enterprise network based services such as routing within the enterprise particularly where the enterprise sites might include a Wireless Local Area Network (WLAN) supporting Voice over Internet Protocol (VoIP) services and the like.

In a WLAN enterprise service offering, a particular enterprise could have more than one site, each site typically served, for example, by a single Private Branch Exchange (PBX). Typical enterprise PBXs however are not equipped to know how to route a call to a destination that does not belong in its domain. Roaming associated with a wireless communication unit provides additional problems for contacting the wireless communication unit when it is moving from one enterprise site to another particularly where the enterprise sites are remote from each other and/or when the lack IP connectivity. Although PBXs within an enterprise may be provided with additional information, management of information can become a problem for large enterprises.

Therefore, to address the above described problems and other problems, what is needed is a method and apparatus for facilitating session control in an inter-site call.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
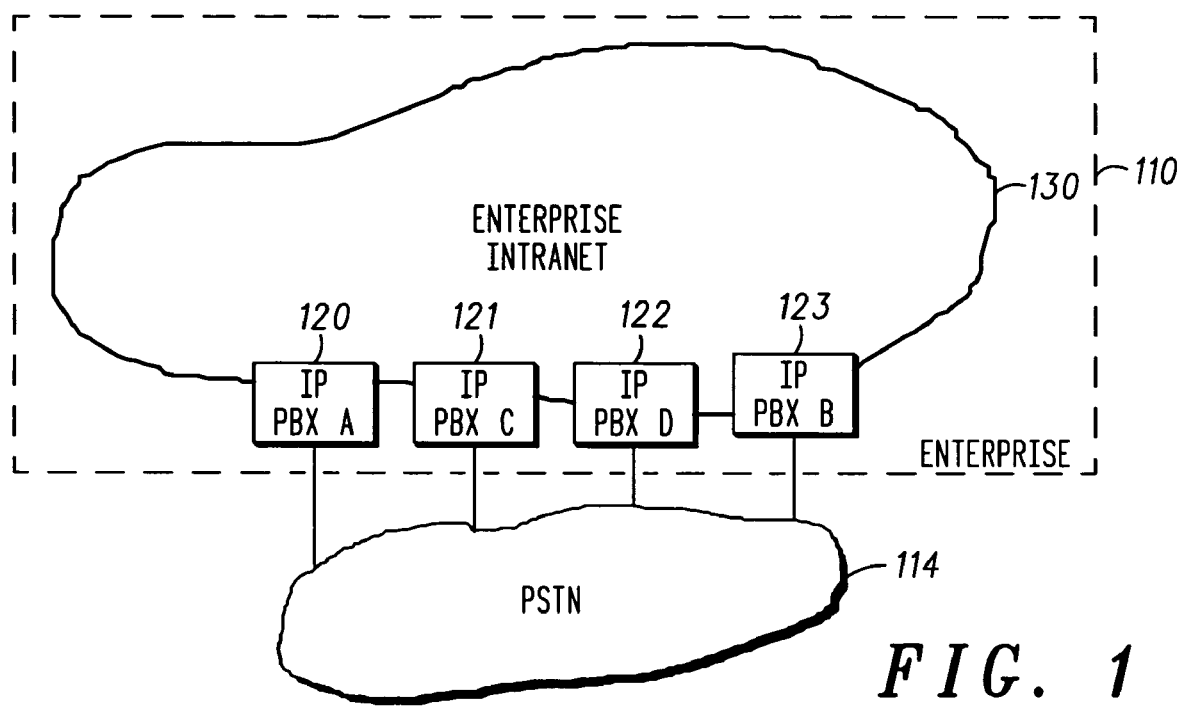
FIG. 1 is a diagram illustrating a simplified and representative environment associated with an exemplary enterprise having sites with exemplary PBXs, and exemplary network connections and connections to a Public Switched Telephone Network (PSTN) in accordance with various exemplary embodiments.

In overview, the present disclosure concerns communications between sites within an enterprise which may or may not be provided with IP connectivity. Calls placed to communication units, which may, in accordance with some embodiments, be stationary and wired or may, in accordance with other embodiments, be wireless units which are often referred to as mobile stations or communication units, such as cellular phones or two-way radios and the like associated with a communication system such as an Enterprise Network, a cellular Radio Access Network, a Radio Access System, an Integrated Digital Enhanced Network, a WLAN or the like. Such communication systems may further provide services such as voice and data communications services to communication units and may be further configured according to system models such as Seamless Converged Communication Across Networks (SCCAN) models or the like.

More particularly, various inventive concepts and principles are embodied in systems, communication units, and methods therein for facilitating inter-site communication by registering ranges of identifiers using a SIP registrar and facilitating roaming using dual mode capabilities associated with exemplary communication units. It should be noted that the term communication unit may be used interchangeably herein with dual-mode communication unit, two-way radio, mobile station, mobile subscriber unit, subscriber unit, wireless subscriber unit, wireless subscriber device or the like. Each of these terms denotes a device ordinarily associated with a user and typically a wireless mobile device that may be used with a public network in accordance with, for example, a service agreement or within a private network such as an enterprise network. Examples of such units include personal digital assistants, personal assignment pads, personal computers equipped for wireless operation, a cellular handset or device, or equivalents thereof provided such units are arranged and constructed for operation in the manner described herein.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

The communication systems and communication units of particular interest are those providing or facilitating voice communications services or data or messaging services over enterprises which operate in connection with cellular wide area networks (WANs), such as conventional two way systems and devices, various cellular phone systems including analog and digital cellular, CDMA (code division multiple access) and variants thereof, VoIP systems, SCCAN, GSM, GPRS (General Packet Radio System), 2.5G and 3G systems such as UMTS (Universal Mobile Telecommunication Service) systems, 3GPP, 3GPP2, 4G, PTT, Internet Protocol (IP) Wireless Wide Area Networks like 802.16, 802.20 or FLASH-Orthogonal Frequency Division Multiplexing (OFDM) network, integrated digital enhanced networks and variants or evolutions thereof. Furthermore, the wireless communication units or devices of interest may have short range wireless communications capability normally referred to as WLAN capabilities, such as IEEE 802.11, Bluetooth, or Hiper-Lan and the like preferably using CDMA, frequency hopping, OFDM or TDMA access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

It will further be appreciated by those of ordinary skill in the art that certain methods and procedures discussed and described herein can be configured in such a way that they may be coupled together without connecting immediately to a subscriber device such as a communication unit. For example, SIP Registrars within one enterprise may register ranges of identifiers registered with them in additional SIP Registrars associated with foreign enterprises to establish a distributed network of connections, for example, between enterprises.

As further discussed herein below, various inventive principles and combinations thereof are advantageously employed to facilitate inter-site call routing and to facilitate roaming between sites.

An exemplary approach for routing calls in enterprises having sites connected with a medium capable of supporting Internet Protocol based communication such as a private IP network, is to register a range of identifiers and a site identifier associated with an enterprise site using a registrar compatible with the Session Initiation Protocol (SIP) as more fully described in Internet Engineering Task Force (IETF) Request For Comments (RFC) 3261, available at www.ietf.org/rfc.html. Accordingly, a User Agent (UA) initiating a call to a communication unit within the enterprise or to another UA can send an INVITE to, for example, to one of the IP PBXs within the enterprise using the identifier associated with the communication unit. It will be appreciated that an exemplary IP PBX may also be equipped with SIP Back to Back UA If the IP PBX does not recognize the identifier, the INVITE message may be forwarded via, for example, an IP connection established therebetween, to a SIP Proxy server/registrar, which may be reside, in accordance with various exemplary embodiments, in an exemplary Inter-site router, where the site identifier for the IP PBX associated with the identifier may be located within the registrar DB or Registry.

A simplified and representative exemplary scenario 100 associated with an exemplary enterprise is illustrated in FIG. 1. It should be noted that in WLAN enterprises, a particular enterprise such as enterprise 110, can easily be configured with more than one site with each site typically being further served by a single IP PBX. Each of exemplary site A, B, C, and D are served respectively by a PBX such as IP PBX A 120, IP PBX B 121, IP PBX C 122, and IP PBX D 123. In a typical enterprise and in enterprise 110, sites are connected, for example through IP PBX A 120, IP PBX B 121, IP PBX C 122, and IP PBX D 123, using some type of private, IP-based network such as IP LAN 130. The interconnection may be accomplished using a physical medium such as a T1 or higher capacity digital line. For a variety of reasons, if IP LAN 130 is available, it is desirable that calls within the enterprise, including calls made between sites be completed using IP LAN 130 whenever possible. It will be appreciated that enterprise 110 and thus IP PBX A 120, IP PBX B 121, IP PBX C 122, and IP PBX D 123 may additionally be connected to the Public Switched Telephone Network (PSTN) 114.

Accordingly, each of IP PBX A 120, IP PBX B 121, IP PBX C 122, and IP PBX D 123 will register their respective domains, ranges A 220, B 221, C 222, and D 223, with SIP registrar 212 in inter-site router 210. It will be appreciated that the mere use of SIP registration is known, for example for the registration of single UA. However, having IP PBXs such as IP PBX A 120, IP PBX B 121, IP PBX C 122, and IP PBX D 123 register a range of identifiers with a central registry such as SIP registrar 212 allows routing therebetween in a manner not previously realized. Thus IP PBX A 120 in one site, will send a SIP REGISTER to inter-site router 210, where range of identifiers, range A 220, such as a range of telephone numbers like 847 555 0000-847 555 9999 could be registered with SIP registrar 212. SIP proxy server 213 can route a call to IP PBX A 120 whenever it gets a call for a number in the range 847 555 0000-847 555 9999. In a more generalized scenario, inter-site router 210 can further perform the call handling functions of an IP PBX. In still another generalized scenario, routing may be assisted not only for SIP related identifiers but for all identifiers.

Such a solution as noted above may be undesirable however since administration of domain and identifier/phone number information for big enterprises having for example, hundreds of sites would be prohibitive. One of ordinary skill can easily imagine an enterprise opening an office at a new site, and installing a new IP PBX at that site. In order to network the new IP PBX with other IP PBXs in the enterprise, the new IP PBX needs to be configured with all the information associated with all the IP PBXs in the network and, in addition, the configuration of all other IP PBXs in the enterprise will need to be updated to include the domain of the new IP PBX for routing.

Figure 2:
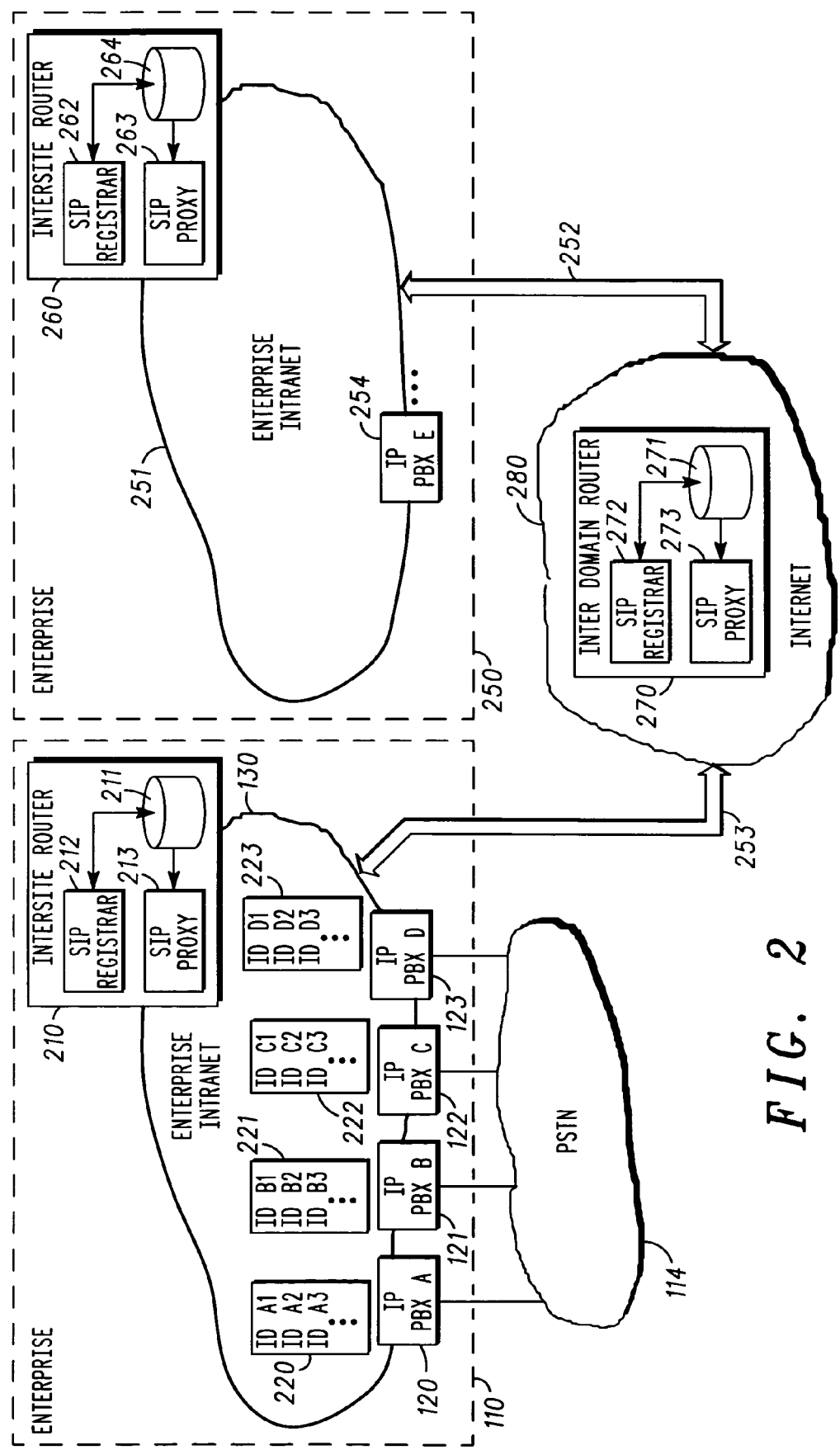
FIG. 2 is a diagram illustrating the exemplary enterprise shown in FIG. 1, having an exemplary inter-site router containing a Session Initiation Protocol (SIP) proxy server, registrar, and registry and having a connection to another exemplary enterprise through a network having an inter-domain router in accordance with various exemplary embodiments.

Thus to overcome the many disadvantages of potential solutions noted above, FIG. 2 shows central inter-site router 210 and SIP storage 211 which may be installed within enterprise 110 and which may be used to configure or route SIP requests received at a PBX serving a site. Each of exemplary sites A, B, C, and D may be served by a respective PBX such as IP PBX A 120, IP PBX B 121, IP PBX C 122, and IP PBX D 123, which PBXs may be updated with the latest information on the state of IP LAN 130 within enterprise 110 including contact information or the like for entities which may be connected to IP LAN 130. Inter-site router 210 will thus facilitate the routing of calls between sites.

Accordingly, each of IP PBX A 120, IP PBX B 121, IP PBX C 122, and IP PBX D 123 will register their respective domains, ranges A 220, B 221, C 222, and D 223, with SIP registrar 212 in inter-site router 210. It will be appreciated that the mere use of SIP registration is known, for example for the registration of single User Agents (UA). However, having IP PBXs such as IP PBX A 120, IP PBX B 121, IP PBX C 122, and IP PBX D 123 register a range of identifiers with a central registry such as SIP registrar 212 allows routing therebetween in a manner not previously realized. Thus IP PBX A 120 in one site, will send a SIP REGISTER to inter-site router 210, where range of identifiers, range A 220, such as a range of telephone numbers like 847 555 0000-847 555 9999 could be registered with SIP registrar 212. SIP proxy server 213 can route a call to IP PBX A 120 whenever it gets a call for a number in the range 847 555 0000-847 555 9999. In a more generalized scenario, inter-site router 210 can further perform the call handling functions of an IP PBX. In still another generalized scenario, routing may be assisted not only for SIP related identifiers but for all identifiers.

In accordance with still other alternative exemplary embodiments, a tree, branch or the like hierarchy of SIP entities such as inter-site router 210 may be configured where SIP entities at the terminating nodes of the tree are able to route calls or call requests to UAs, and higher level SIP entities route to SIP entities at the next level down in the hierarchy. In accordance with various alternative exemplary embodiments, the inventive concepts discussed and described herein may be applied to facilitate routing between enterprises as will be described in greater detail hereinafter.

By incorporating inter-site router 210 into enterprise 110, newly installed IP PBXs need only be configured with the address of inter-site router 210. IP PBX A 120, IP PBX B 121, IP PBX C 122, and IP PBX D 123 may then register respective ranges of identifiers as noted above with inter-site router 210. When any one of IP PBX A 120, IP PBX B 121, IP PBX C 122, and IP PBX D 123 gets a call request such as a SIP INVITE specifying a destination number or identifier that it does not recognize, the SIP INVITE is forwarded to inter-site router 210 where the identifier is searched for in SIP storage 211. It will be appreciated that as part of registration, the particular IP PBX will register a range of identifiers and a contact address for itself. Once the identifier is located, the contact address for the corresponding IP PBX can be obtained and provided for further routing the call request to the proper destination IP PBX. Alternatively, the originating PBX may be redirected to the destination PBX.

Using the installation of a new IP PBX at a site as an example, once the new IP PBX is configured with the contact address, identifier, or the like of inter-site router 210, it will register its domain, that is, the range of identifiers, telephone numbers, or the like, which it serves, with inter-site router 210. The new IP PBX may now accept calls from other IP PBXs in enterprise 110, without requiring any change to the other IP PBX. The new IP PBX may also route calls to other IP PBXs in enterprise 110 as long as the other IP PBXs have registered their respective ranges of identifiers with inter-site router 210.

It will be appreciated that in accordance with other exemplary and alternative exemplary embodiments, the inventive concept of registration of a range of identifiers with a central SIP registry such as inter-site router 210 can be extended and used to route calls between enterprises. In such an exemplary scenario, a second enterprise such as enterprise 250, which is provided with inter-site router 260 having SIP registrar 262, SIP proxy 263, and SIP registry/database 261, may be coupled to enterprise 110 through connections 252 and 253 respectively to network 280, such as the Internet or the like. It will be appreciated that network 280 may further contain inter-domain router 270 containing SIP registrar 272, SIP proxy 273, and SIP registry/database 271. Accordingly, ranges of identifier information associated with, for example, IP PBX E 254, which, as will be appreciated, is naturally connected to PSTN 114 and, since well understood in the art, such connection is not shown, are registered with inter-domain router 270. Additionally, it will be appreciated that other IP PBXs (not shown), and other domains to which enterprise 250 is associated can register ranges of identifier information with, for example, inter-domain router 270 in a manner as described, for example herein above, to establish an exemplary hierarchy of routers. It will be appreciated that, if present, inter-site routers, such as inter-site router 210 and inter-site router 260 will most likely perform registration of respective ranges of identifiers with inter-domain router 270 on behalf of respective enterprises to which they are connected and serve. However, if an inter-site router is not present within an enterprise, or even in some circumstances where an inter-site router is present, any one or more exemplary IP PBXs, such as IP PBX A 120, IP PBX B 121, IP PBX C 122, IP PBX D 123, and IP PBX E 254 may independently register ranges of identifiers or the like, with inter-domain router 270.

Figure 3:
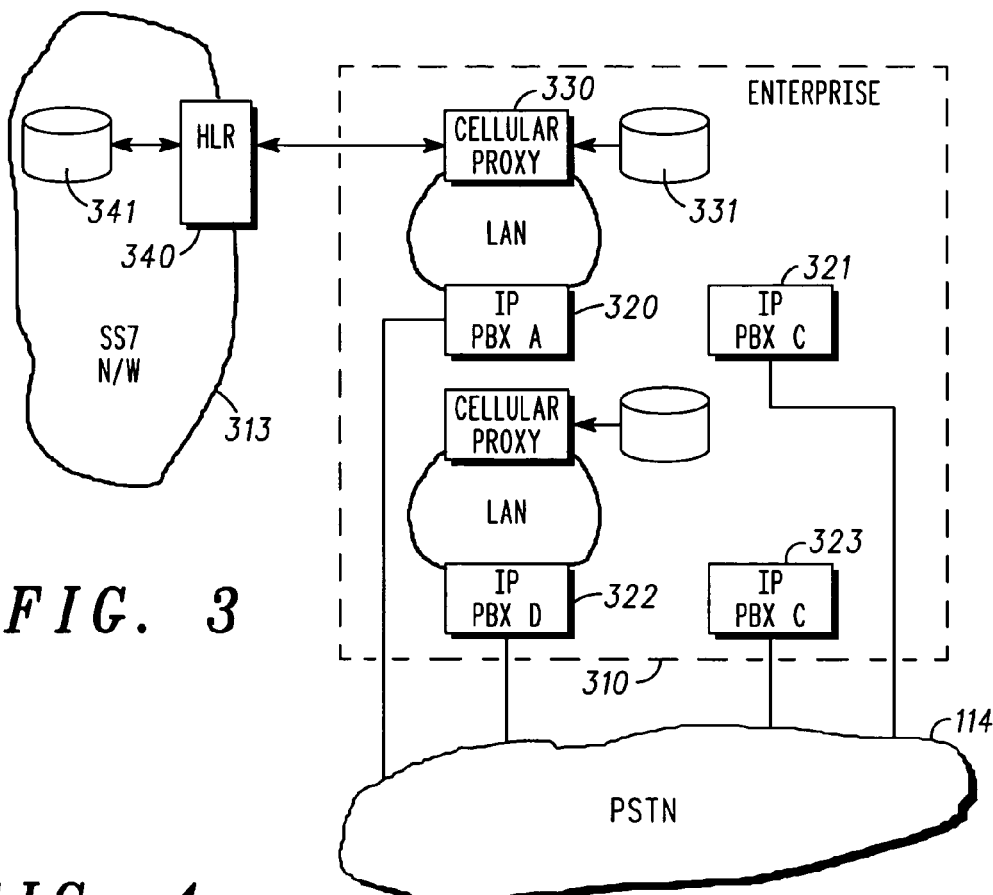
FIG. 3 is a diagram illustrating an exemplary enterprise having sites without inter-site network connections, with a cellular proxy server in accordance with various exemplary embodiments.

In conventional SCCAN systems, roaming between sites is not supported. It will also be appreciated that in accordance with various exemplary and alternative exemplary embodiments, the inventive concepts discussed and described herein may be used to support roaming between SCCAN sites in enterprise 310 as shown in FIG. 3. Calls originating from users (not shown) roaming within enterprise 310 from, for example, their home site such as the site associated with IP PBX D 322 to a foreign site such as the site associated with IP PBX A 320, may be routed through IP PBX D 322 at the home site, allowing home control of services and features. As noted above with regard to various exemplary embodiments, roaming between SCCAN sites can be facilitated using a private IP backbone such as IP LAN 130. Some enterprises however may not be large enough to have a private IP network between enterprise sites. Such enterprises may not be provided with any IP connectivity between sites. In such cases, roaming support between sites is not possible by simply registering identifiers with, for example, a SIP registrar since there would be no way to complete the connection under SIP due to the lack of an IP based connection medium.

In accordance with other exemplary embodiments, roaming between sites, such as SCCAN sites may be supported in enterprise 310 using dual mode communication units. Accordingly, when an exemplary dual mode communication unit roams to a foreign site such as the site associated with IP PBX A 320 in enterprise 310, it registers through the cellular proxy server at the foreign site with the HLR located in the cellular SS7 network. Under conventional cellular protocol, HLR 340 will be updated for example with contact information associated with cellular proxy server 330 which update may be stored, for example, in database 331, over a cellular SS7 313 connection. It will be appreciated that IP PBX D 322 may also be provided with cellular proxy 332 having for example database 333 as may other IP PBXs within enterprise 310 be provided with cellular proxy service.

Figure 4:
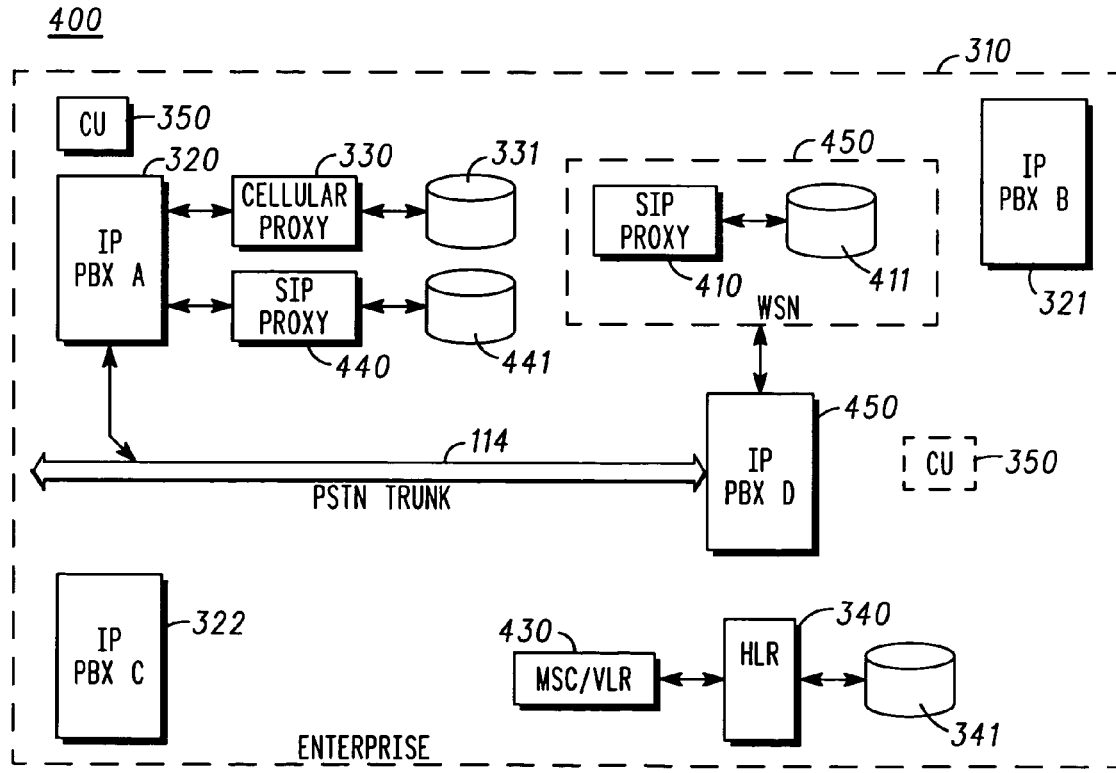
FIG. 4 is a diagram further illustrating an exemplary enterprise having sites without inter site network connections, with a cellular proxy server in accordance with various exemplary embodiments.

A more detailed example of the operation of roaming support in accordance with various exemplary embodiments is shown in FIG. 4. When a call is received, for example, at IP PBX D 322 in the home site for the roamed communication unit (CU) 350, the SIP Proxy 410 in WSN 450 would respond back with a "302 Moved Temporarily", and provide the cellular number of CU 350 as contact to IP PBX D 322. IP PBX D 322 then uses PSTN trunk 114 to call the cellular number provided by SIP Proxy 410. The call will land on MSC 430 within the cellular provider's network. When MSC 430 contacts HLR 340 to get routing information, HLR 340 will contact cellular proxy 330 at the visited location to get a routing number. It will be appreciated that cellular proxy 330, instead of providing the enterprise number of CU 350, will provide an arbitrary number from, such as A1, a pool of numbers assigned for roaming purposes. Since the arbitrary number A1 will be one of the range of numbers being served by IP PBX A 320 at the visited site, it will be useful to assign a pool of spare or unused number to be used for roaming purposes. When MSC 430 calls the roaming number, the call will land on IP PBX A 320 at the visited site. IP PBX A 320 forwards the SIP INVITE associated with the call to SIP Proxy 440, which will know to forward the request to the CU 350. The knowledge at SIP Proxy 440 may be gained, for example, through a proprietary message exchange between cellular proxy 330 and SIP Proxy 440.

It will be appreciated that the association between the cellular number of the CU 350 and the arbitrary number assigned by cellular proxy 330 is only true for the duration of the call after which the arbitrary number will be returned to the pool to be reused for future assignment to roaming devices. Thus roaming support can be provided without requiring a private IP network. Cellular network constructs may be used to direct the call to IP PBX A 320 at the visited site. It will be appreciated that the inventive concept discussed and described in connection with the present embodiment may be used in a SCCAN multi-site system with or without a private IP network and the attendant inventive concepts described herein above for example with regard to identifier range registration and the like. An exemplary SCCAN infrastructure can be configured to use, for example, one of two modes of operation for roaming. For example, an exemplary SCCAN infrastructure device can be programmed for one mode of operation by default such as the mode involving a private IP network, and another mode of operation such as operation using a cellular proxy server in the case of IP network connectivity loss between sites.

Figure 5:
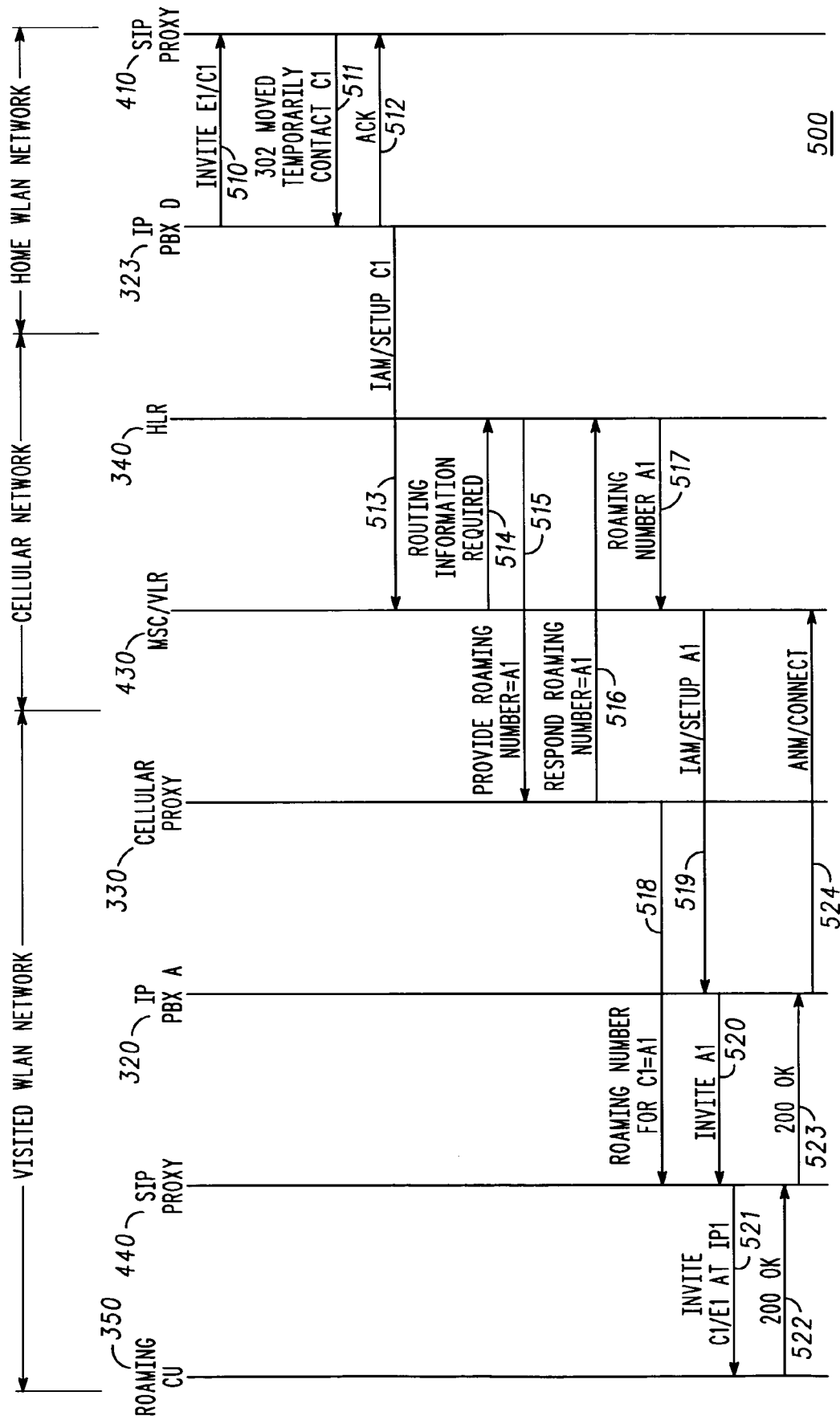
FIG. 5 is a message sequence diagram illustrating exemplary roaming support within portions of an exemplary enterprise in accordance with various exemplary embodiments.

A more detailed understanding of the concepts described in connection with roaming support where no private IP network is available is shown in FIG. 5. When a call for CU 350 is received at IP PBX D 322, SIP INVITE message 510 can be forwarded to SIP proxy 410 using the enterprise number (E1) or cellular number (C1) of CU 350. SIP proxy 410 responds with 302 Moved Temporarily message 511 having the cellular contact number for CU 350, which message is followed by ACK message 512. C1 may be used by IP PBX D 322 to contact CU 350 outside enterprise 310 by sending Initial Address Message (IAM)/SETUP message 513 over PSTN 420 using C1 for the Called Party Number (CPN) to MSC 430. MSC 430 may then send Routing Information Request message 514 to HLR 340. As noted above, HLR 340 may obtain current routing information from cellular proxy 330 over, for example, cellular SS7 connection 313 shown, for example, in FIG. 3, by sending message 515 requesting the roaming number for CU 350. Cellular proxy 330 may respond with message 516 containing for example roaming number A1 for connecting with CU 350 in the roamed site. HLR 350 then provides A1 to MSC 430 in message 517. Cellular proxy 330 may also register A1 at SIP proxy 440 with message 518. In response to message 517 updating MSC 430 with A1, another IAM/SETUP message 519 is sent from MSC 430 to IP PBX A 320. IP PBX A 320 may then send SIP INVITE message 520 to SIP proxy 440 using the arbitrary roaming number A1. After looking up A1 in database 441 to obtain C1/E1 for CU 350, SIP proxy 440 may then forward a SIP INVITE message 521 using C1/E1. It will be appreciated that, as noted above, C1=cellular number of CU 350 and E1=enterprise number of the CU 350. It will further be appreciated that CU 350 may use other forms of identifier, such as an IP address, local extension, or the like, without departing from the invention. CU 350 may then respond to SIP proxy 440 with 200 OK message 522, SIP proxy 440 may responds to IP PBX A 320 with 200 OK message 523, and IP PBX A 320 can complete the call by sending Answer Message ANM/CONNECT message 524.

Figure 6:
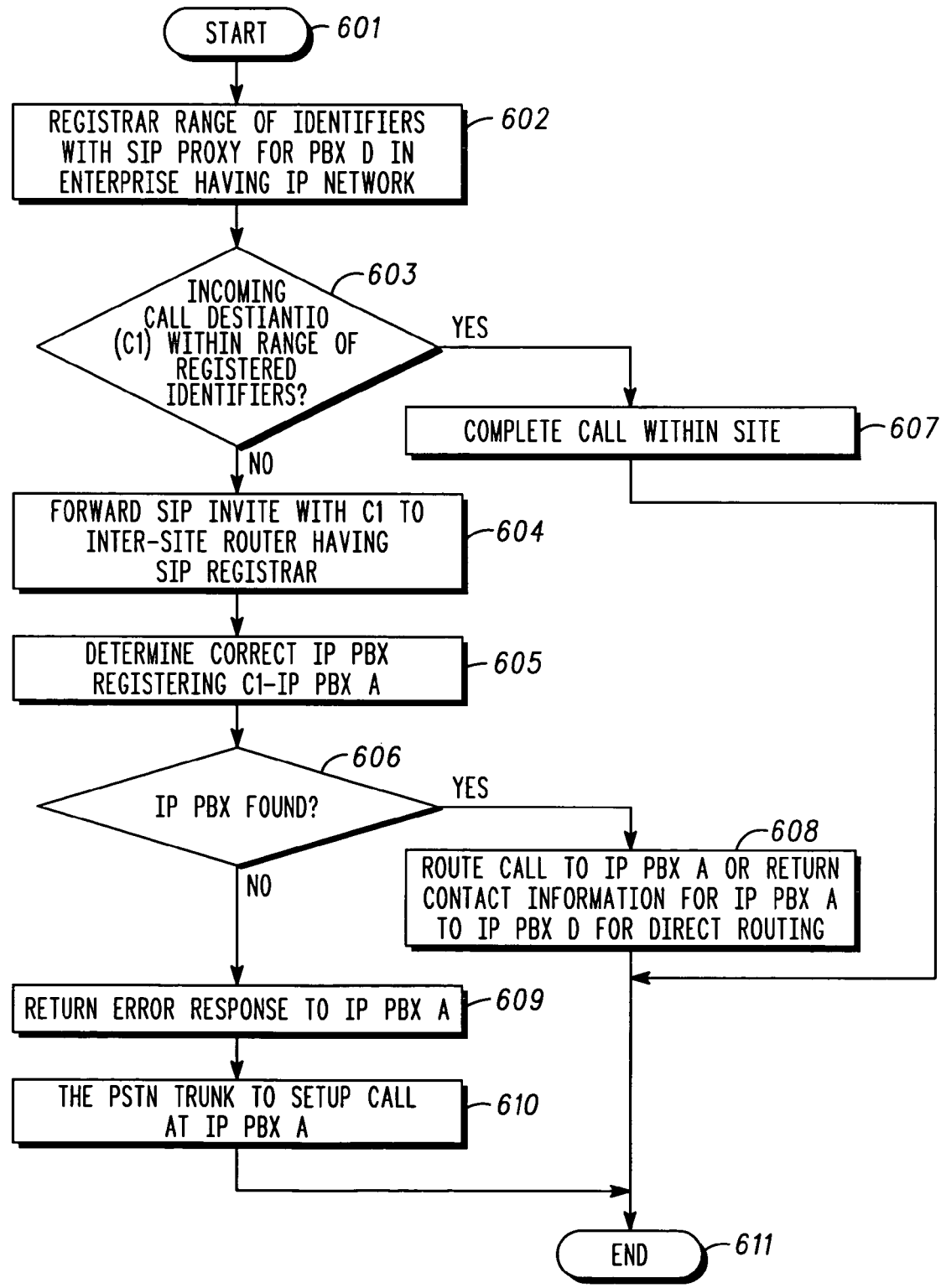
FIG. 6 is a flow chart illustrating an exemplary procedure for registering a range of identifiers in accordance with various exemplary embodiments.

Further in accordance with various exemplary embodiments, exemplary procedure 600 used, for example in enterprise 110 to support movement between sites when a private IP network is available, is shown in FIG. 6. After start at 601, a range of identifiers, such as range 223, may be registered with a SIP registrar/proxy server, such as SIP registrar 212 of inter-site router 210, associated with a first IP PBX such as IP PBX D 123 at 602. If it is determined at 603 that an incoming call having a destination, called party identifier or the like, such as C1, is not associated with IP PBX D 123, a SIP INVITE may be issued to the SIP registrar/proxy server at 604. It will be appreciated that in the manner of IP PBX D 123 in 602, other IP PBXs within the enterprise will register with the SIP registrar/proxy server and thus at 605, the correct IP PBX, such as IP PBX A 120 for C1 may be determined. If IP PBX A 120 can be found at 606, then the call is routed thereto at 608 directly by the SIP registrar/proxy server or alternatively, the contact information for IP PBX A 120 may be returned to IP PBX D 123 so that the call may be routed directly between PBXs after which the procedure ends at 611. If IP PBX A 120 cannot be found at 606, an ERROR response may be returned at 609, and the PSTN trunk may be used to set up the call at IP PBX A 120 at 610 and the procedure will end at 611.

It will be appreciated that if C1/E1 is determined to be within the range of IP PBX D 123, the call can be completed within the site at 607 whereupon the procedure ends at 611. It will be appreciated that, in general when the cellular number can be used to contact CU 350, it should also be possible to use the enterprise number E1 to contact CU 350. In the case where E1 is used for contact, it is assumed that enterprise numbers are registered with an exemplary SIP Registrar in an exemplary inter-site router. Similarly, where C1 is used for contact it is assumed that cellular numbers are registered with an exemplary SIP Registrar in an exemplary inter-site router.

Figure 7:
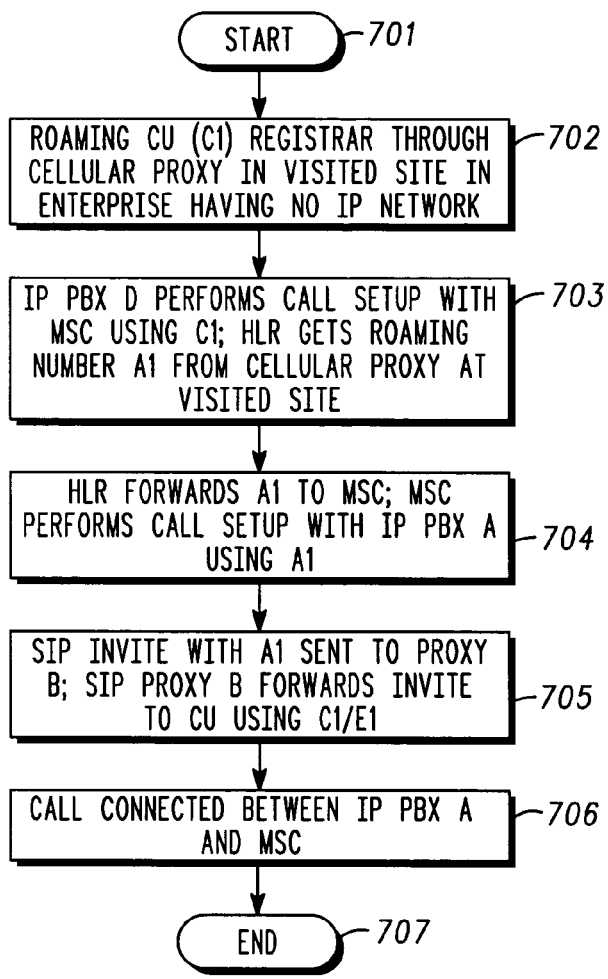
FIG. 7 is a flow chart illustrating an exemplary procedure for supporting inter-site roaming in accordance with various alternative exemplary embodiments.

In accordance with various additional exemplary embodiments, another exemplary procedure 700 may be used, for example in enterprise 310 to support movement between sites when a private IP network connecting sites is not available, as shown in FIG. 7. After start at 701, a CU, such as CU 350 roams from a home site served, for example by IP PBX D 322, to a foreign site served, for example by IP PBX A 320. The CU which has a cellular number of C1 and an enterprise number of E1 can register at 702 with an exemplary cellular proxy serving the visited site.

When a call to the CU comes into IP PBX D 322 using for example C1 or E1, IP PBX D 322 forwards a SIP INVITE to a local SIP proxy. The local SIP proxy may indicate to IP PBX D 322 that the CU has temporarily moved using, for example, a SIP 302 Moved Temporarily message. IP PBX D 322 may attempt a cellular call at 703 using C1 which lands at or is otherwise routed to or through an MSC within the cellular network. The HLR can then query the cellular proxy associated with the visited site at which point an arbitrary roaming number A1 may be returned to the HLR. It will be appreciated that the cellular proxy may further query the local SIP Proxy B for A1. The HLR may then forward the roaming number A1 to the MSC which attempts to connect with IP PBX A 320 using A1 at 704. IP PBX A 320 sends a SIP INVITE using A1 to the local SIP Proxy B whereupon the SIP INVITE is forwarded to the CU using its C1/E1 number at 705. Finally, through a series of 200 OK acknowledges, the call may be connected between IP PBX A 320 and the MSC at 706 where the exemplary procedure ends at 707.

Figure 8:
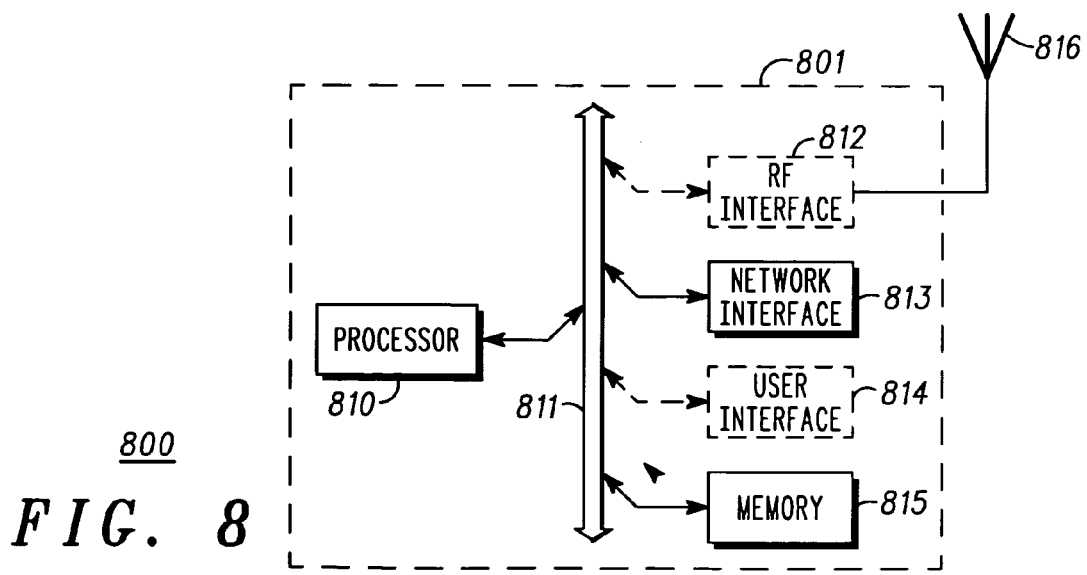
FIG. 8 is a diagram illustrating an exemplary apparatus in accordance with various exemplary and alternative exemplary embodiments.

To better appreciate the application of the above described exemplary procedures and inventive principles, an exemplary apparatus is shown in FIG. 8. It will be appreciated that apparatus 801 may be an exemplary device such as an exemplary inter-site router, inter-domain router, SIP controller, SIP registrar/proxy server, or the like without departing from the invention. In any case, apparatus 801 preferably includes processor 810, memory 815, and RF interface 812, coupled by bus 811. Optional RF interface 812 may include antenna 816 to send and receive signals over an air interface or the like, and, network interface 813 may provide an interface to a network such as a private IP network, Local Area Network (LAN), a Public Switched Telephone Network (PSTN), a Wireless Local Area Network (WLAN) or other network as would be appreciated by one of ordinary skill.

Apparatus 801 may also be provided with user interface 814, particularly when apparatus 801 is embodied as a User Agent or the like, although in many instances no user interface will be necessary. It will further be appreciated that as the inventive principles described herein are suitable for implementation in, for example, a software program, the instructions associated with the computer program and capable of being read by processor 810, may preferably be stored in memory 815 and may be executed in order to perform the useful functions and routines described herein.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for facilitating call routing in an enterprise having a first site capable of connecting to a second site in the enterprise through a network associated with the enterprise, the network operating according to a network protocol, the method comprising:

registering at least a first plurality of identifiers and a first site identifier associated with the first site with an inter-site router operating in accordance with a protocol compatible with the network protocol and operating in the enterprise; and routing a call request received at a second site to the inter-site router directly over the network as the first site and the second site are not capable of being connected through the network and wherein the call request is routed in accordance with the network protocol and the protocol compatible with the network protocol when an identification number associated with the call request is not recognized at the second site such that the inter-site router can forward the call request from the second site and directly route the call to the first site using the first site identifier when the identification number associated with the call request matches one of the first plurality of identifiers.

2. A method in accordance with claim 1, further comprising registering at least a second plurality of identifiers and a second site identifier associated with a second site the second site capable of residing within a second enterprise.

3. A method in accordance with claim 1, further comprising registering at least a second plurality of identifiers and an enterprise identifier associated with a second enterprise with an inter-domain router, the enterprise and the second enterprise being connected through the network, the inter-domain router capable of being accessed using the network.

4. A method in accordance with claim 1, wherein:

the registering the at least a first plurality of identifiers and the first site identifier includes registering a first contact address associated with the first site; and the first plurality of identifiers is registered with the inter-site router as a range of identifiers associated with the first contact address.

5. A method in accordance with claim 4, wherein:

the protocol includes a Session Initiation Protocol (SIP); and the first contact address is associated with a device associated with the first site, the device having a SIP Address-of-Record.

6. A method for facilitating inter-site call routing in an enterprise having at least a first site and a second site connected through a network associated with the enterprise, the network operating according to a network protocol, the method comprising:

registering a first plurality of identifiers and a first site identifier associated with the first site and a second plurality of identifiers and a second site identifier associated with the second site with an inter-site router operating in accordance with a protocol compatible with the network protocol and operating in the enterprise; and routing a call request received at one of the first site and the second site to the inter-site router directly over the network as the first site and the second site are not capable of being connected through the network and directly routing the call to the other of the first site and the second site in accordance with the network protocol and the protocol compatible with the network protocol when an identification number associated with the call request does not match one of the first plurality of identifiers and the second plurality of identifiers associated with the one of the first site and the second site where the call request is received.

7. A method in accordance with claim 6, wherein:
the registering the first plurality of identifiers associated with the first site and the second plurality of identifiers associated with the second site includes registering a first contact address associated with the first site and a second contact address associated with the second site; and
the first plurality of identifiers are registered with the inter-site router as a first range of identifiers associated with the first contact address and the second plurality of identifiers are registered with the inter-site router as a second range of identifiers associated with the second contact address.

8. A method in accordance with claim 6, wherein the network protocol includes an Internet Protocol (IP).

9. A method in accordance with claim 6, wherein the protocol includes a Session Initiation Protocol (SIP).

10. A method in accordance with claim 8 wherein the protocol includes a Session Initiation Protocol (SIP).

11. A method in accordance with claim 6, wherein one of the first plurality of identifiers and the second plurality of identifiers includes a range of contact numbers served by a corresponding one of the first site and the second site associated with the one.

12. A method in accordance with claim 6, wherein the inter-site router includes a Session Initiation Protocol (SIP) proxy server and a SIP registrar.

13. A method in accordance with claim 6, wherein one of the first site and the second site includes an Internet Protocol (IP) compliant Private Branch Exchange (PBX).

14. An apparatus for facilitating call routing in an enterprise having a first site capable of connecting to a second site through a network associated with the enterprise, the network operating in accordance with a network protocol, the apparatus comprising:
a first registrar having a first proxy coupled to the network and operating in accordance with a protocol compatible with the network protocol, the first registrar configured to register a plurality of identifiers and a first site identifier associated with the first site in a database associated with the first registrar;
a second register coupled to the second site when the first site and the second site are not capable of being connected through the network, the second register configured to register contact information associated with a dual mode communication unit, and
a Private Branch Exchange (PBX) coupled to the first registrar and the network, the PBX configured to route a call request received at a second site to the first registrar directly over the network in accordance with the network protocol and the protocol compatible with the network protocol when an identification number associated with the call request is not recognized at the second site, the first proxy configured to determine if the identification number is registered with the first registrar as one of the plurality of identifiers, the first proxy further configured to forward the call request to the first site and directly route the call to the first site using the first site identifier when the identification number associated with the call request matches one of the first plurality of identifiers, and
wherein the apparatus is configured as a part of and operates in the enterprise.

15. An apparatus in accordance with claim 14, further comprising a cellular proxy associated with a cellular network, the cellular proxy coupled to the first site and, when the first site and the second site are not capable of being connected through the network, the cellular proxy configured to:
send registration information associated with the dual mode wireless communication unit visiting a location associated with the first site to a Home Location Register (HLR) associated with the dual mode wireless communication unit at the second site; and
send contact information associated with the dual mode communication unit at the first site to the HLR when the HLR requests a roaming contact for the dual mode wireless communication unit associated with a call received for the roaming dual mode communication unit at the second site.

16. An apparatus in accordance with claim 15, wherein second registrar further includes a second proxy configured to complete the call with the dual mode communication unit.

17. An apparatus in accordance with claim 14, wherein the protocol includes a Session Initiation Protocol (SIP) and the network protocol includes an Internet Protocol (IP).

18. An apparatus in accordance with claim 14, wherein the cellular network includes one of a Global System Mobile (GSM) cellular network, and a Code Division Multiple Access (CDMA) cellular network.

19. An apparatus in accordance with claim 14, wherein the plurality of identifiers includes one or more of a range of enterprise telephone numbers and a range of cellular numbers served by the first site.

20. An apparatus in accordance with claim 14, wherein the first registrar includes a Session Initiation Protocol (SIP) registrar and wherein the first proxy includes a SIP proxy server.

21. An apparatus in accordance with claim 14, wherein the PBX includes an Internet Protocol (IP) compliant PBX.

22. An apparatus in accordance with claim 15, wherein the cellular proxy is further configured to exchange a message associated with the cellular network with the proxy coupled to the first registrar and the network, the message associated with providing an arbitrary number selected from a pool of numbers as the roaming contact.

23. An apparatus in accordance with claim 22, wherein the proxy coupled to the first registrar and the network is further configured to determine the contact information associated with the dual mode communication unit when the call received at the second site is for the roaming contact.

* * * * *